United States Patent [19]

Sander et al.

[11] 4,317,087
[45] Feb. 23, 1982

[54] APPARATUS FOR IMPROVING THE WORKING TIME OF THE XeBr LASER

[75] Inventors: Robert K. Sander; George Balog; Emma T. Seegmiller, all of Los Alamos, Minn.

[73] Assignee: The United States of America as represented by the United States Department of Energy, Washington, D.C.

[21] Appl. No.: 127,008

[22] Filed: Mar. 4, 1980

[51] Int. Cl.$^3$ .............................................. H01S 3/22
[52] U.S. Cl. ........................................ 372/57; 372/59
[58] Field of Search .................. 331/94.5 G, 94.5 PE, 331/94.5 T

[56] References Cited

U.S. PATENT DOCUMENTS

| | | | |
|---|---|---|---|
| 3,789,320 | 1/1974 | Hepburn | 331/94.5 G |
| 4,031,484 | 6/1977 | Freiberg et al. | 331/94.5 G |
| 4,068,196 | 1/1978 | Hohla et al. | 331/94.5 G |
| 4,099,143 | 7/1978 | Foster | 331/94.5 G |
| 4,259,645 | 3/1981 | Sze et al. | 331/94.5 G |

OTHER PUBLICATIONS

Hart et al., "Kinetic Model of the XeBr Rare-Gase Monohalide Excimer Laser", *Journal of Applied Physics*, vol. 47, No. 5, May 1976, pp. 2033-2036.
Mangano et al., "Electron-Beam-Controlled Discharge Pumping of the XeF Laser", *Applied Physics Letters*, vol. 29, No. 7, Oct. 1, 1976, pp. 426-428.
Sze et al., "High-Energy Lasing of XeBr in an Electric Discharge", *Applied Physics Letters*, vol. 32, No. 8, Apr. 15, 1978, pp. 479-480.
Schneider et al., "Hydrogen Bromide (Hydrobromic Acid) by Direct Combination Over Platinized Silica Gel", *Inorganic Synthesis*, vol. 1, 1939 pp. 152-155.
Johnson et al., "A Closed-Cycle Gas Recirculating System for Rare-Gas Halide Excimer Lasers", Appl. Phys. Lett. 32(5) Mar. 1, 1978, pp. 291-292.
Burlamacchi, "Long-Life Operation of an XeCl Excimer Laser", Appl. Phys. Lett. 34(1), Jan. 1, 1979, pp. 33-35.

*Primary Examiner*—James W. Davie
*Attorney, Agent, or Firm*—Edward C. Walterscheid; Paul D. Gaetjens; Richard G. Besha

[57] ABSTRACT

In XeBr lasers which make use of HBr as the source of bromine, it has been found that the working life of the laser is limited because of dissociation of the HBr in the lasing region to form $H_2$ and $Br_2$. Accordingly, apparatus is disclosed for substantially improving the working time of the XeBr laser wherein means are provided for recombining $H_2$ and $Br_2$ into HBr and for continuously circulating the gaseous working medium from the lasing region through the recombination region.

11 Claims, 4 Drawing Figures

APPARATUS FOR IMPROVING THE WORKING TIME OF THE XeBr LASER

BACKGROUND OF THE INVENTION

The U.S. Government has rights in this invention persuant to Contract No. W-7405-ENG-36 between the U.S. Department of Energy and the University of California.

The invention described herein relates to gas lasers and more specifically to the XeBr gas laser.

Although XeBr was the first noble-gas monohalide excimer lased, it did not at first show any substantial promise of becoming a useful coherent source. All early attempts to produce XeBr lasing were marginal, with the emission being so close to threshold that no estimate of output energy could be reasonably be made. More recently, significant lasing output has been achieved through the use of electrical discharges rather than an electron beam as the excitation source.

As pointed out by Sze et al., Appl. Phys. Lett., vol. 32, pp. 479-80 (Apr. 15, 1978), HBr may advantageously be used as the halogen donor to produce high-energy lasing of XeBr in an electric discharge. Unfortunately, Sze et al. found that the lifetime of the static gas fill in their system was severely limited, and that after only a small number of lasing pulses, the output lasing energy rapidly degraded as a consequence of the disappearance of HBr molecules from the static gas fill. They attributed the loss of HBr to reaction with the materials of their discharge structure. The art teaches that the presence of sufficient $Br_2$ in the working medium will serve as a quenching mechanism for XeBr lasing, but Sze et al. did not believe that $Br_2$ buildup in their working medium could account for the observed degradation lasing energy.

SUMMARY OF THE INVENTION

Accordingly, it is an object of this invention to provide a XeBr laser system in which the number of high-energy pulses capable of being obtained from a single static gas fill is substantially increased. Another object is to provide an XeBr laser system using HBr as the halogen donor wherein the loss of HBr from the static gas fill as a result of operation of the laser is significantly alleviated.

Additional objects, advantages, and novel features of the invention will be set forth in the description which follows, and in part will become apparent to those skilled in the art upon examination of the following or may be learned by practice of the invention. The objects and advantages of the invention may be realized and obtained by means of the instrumentalities and combinations particularly pointed out in the appended claims.

To achieve the foregoing and other objects and in accordance with the purpose of the present invention, as embodied and broadly described herein, a XeBr laser system is provided which has a closed loop conduit through which the gaseous working medium may be repeatedly circulated. The gaseous working medium contained in this closed loop circuit is initially comprised of xenon, HBr, and a desired rare gas diluent in a desired ratio. The conduit has an optical gain region having means for producing coherent laser radiation. Downstream of this optical gain region, means are positioned in the conduit for inducing recombination of $H_2$ into $Br_2$ into HBr. Finally, the conduit has circulation means for continuously pumping the working medium around the fluid circuit described by the conduit.

Preferably, the means for inducing recombination of $H_2$ and $Br_2$ into HBr includes means for heating the working medium. The means for inducing recombination of $H_2$ and $Br_2$ may be means for photodissociating the $H_2$ molecules; however, it is preferred that this means comprise catalytic means for dissociating $H_2$. In a preferred embodiment, the laser system of the invention has means disposed in the conduit between the means for inducing recombination of $H_2$ and $Br_2$ and the optical gain region for removing unreacted bromine from the working medium.

A primary advantage of the present invention over the prior art resides in the capability to provide many more pulses of high energy laser output without replacement of the static gas fill which constitutes the initial working medium.

BRIEF DESCRIPTION OF THE DRAWINGS

The various objects, features, and advantages of the present invention will become more apparent in light of the accompanying drawings, which are incorporated in and form a part of the specification, illustrate several embodiments of the present invention, and, together with the description, serve to explain the principles of the invention. In the drawings.

DETAILED DESCRIPTION OF THE INVENTION

Reference will now be made in detail to the present preferred embodiment of the invention, an example of which is illustrated in the accompanying drawings.

Figure 1:
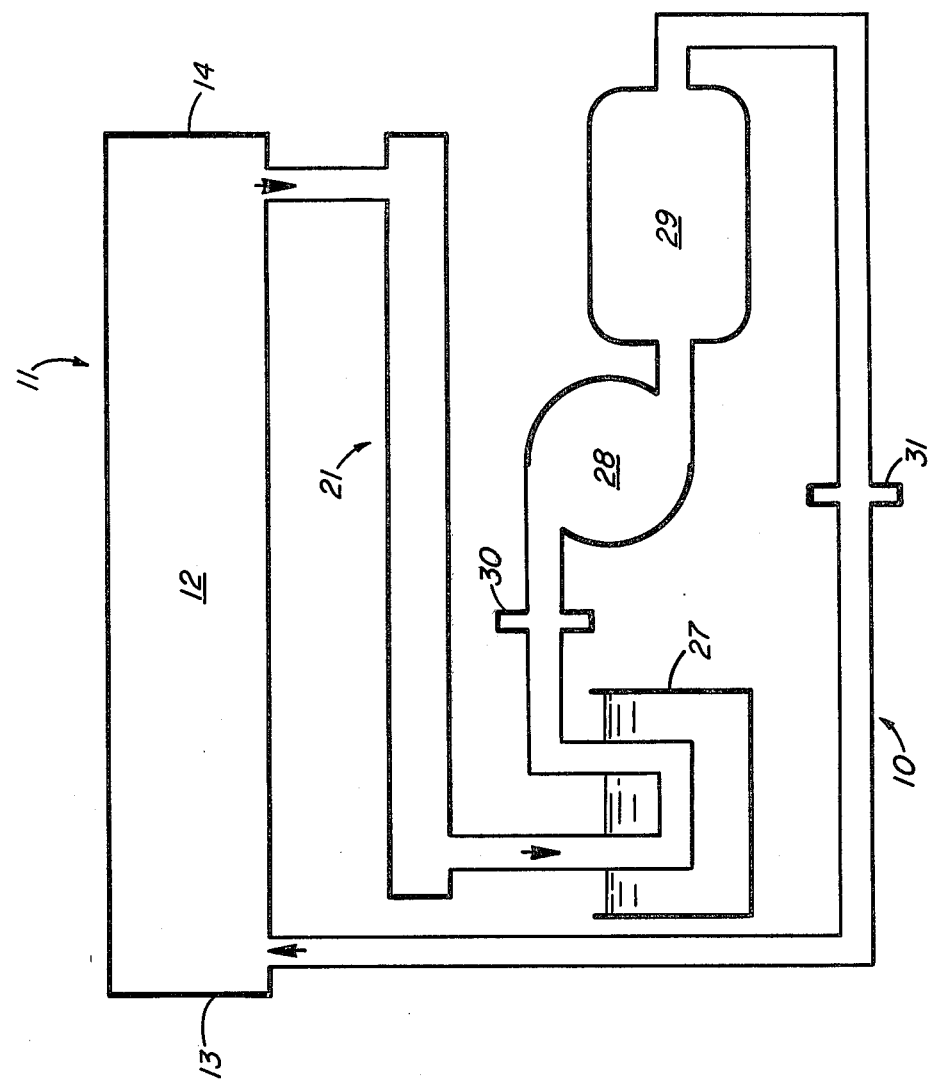
FIG. 1 is a simplified schematic of an overall closed cycle XeBr laser system in accordance with the present invention.
Figure 4:
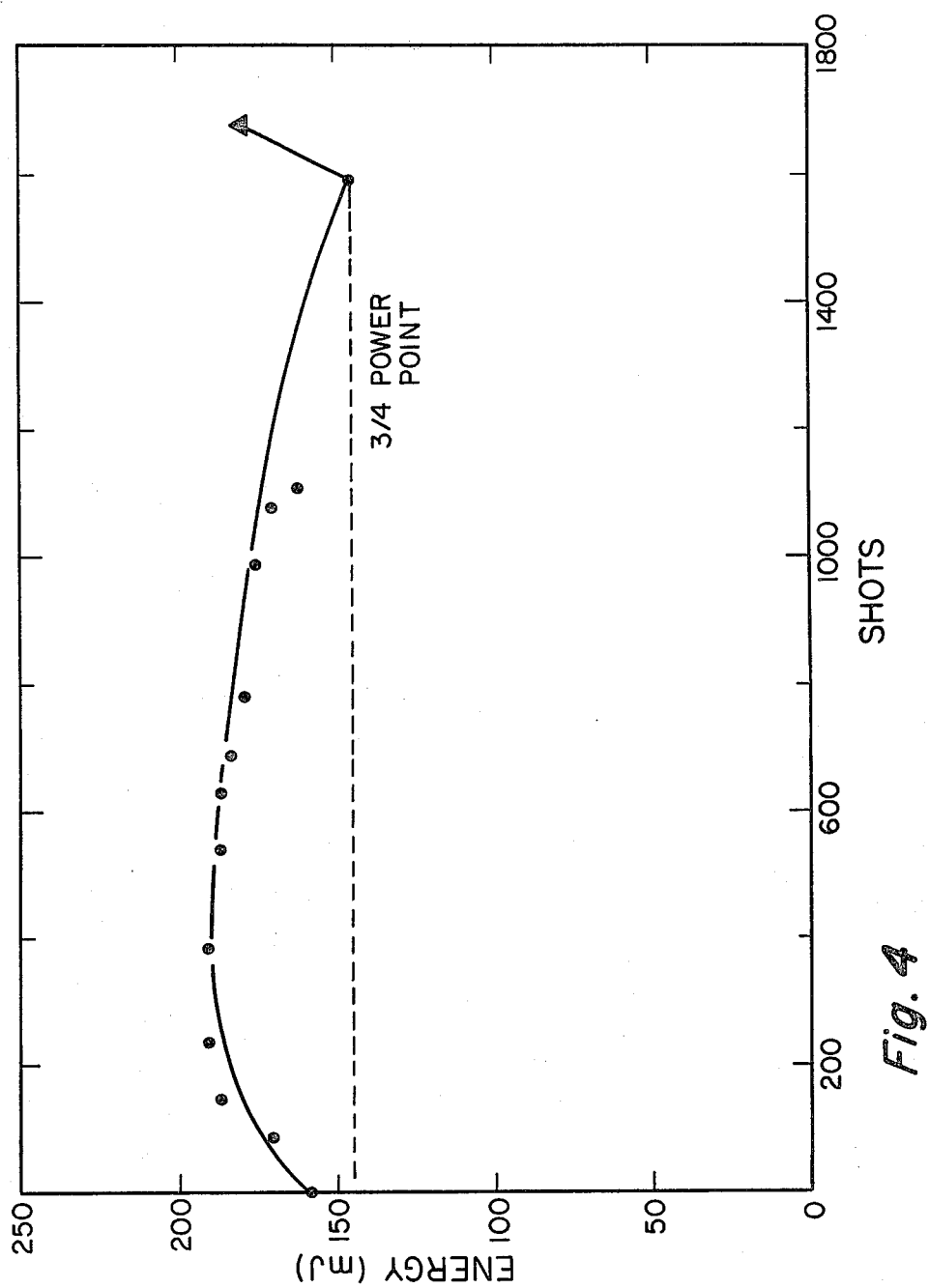
FIG. 4 shows the energy per pulse of the XeBr laser of the invention as a function of the number of shots.

In accordance with the invention and as shown in FIG. 1 a closed loop conduit 10 is provided in which a gaseous working medium comprising initially xenon, HBr, and a desired rare gas diluent in a desired ratio is circulated clockwise. Although any ratio of xenon, HBr, and diluent which will result in satisfactory lasing may be used, a preferable ratio and the one used to obtain the data of FIG. 4 is 5 vol % xenon, 0.15 vol % HBr, with the remainder being the inert diluent. Typically, the diluent may be argon, neon, or a mixture of helium and neon.

Figure 2:
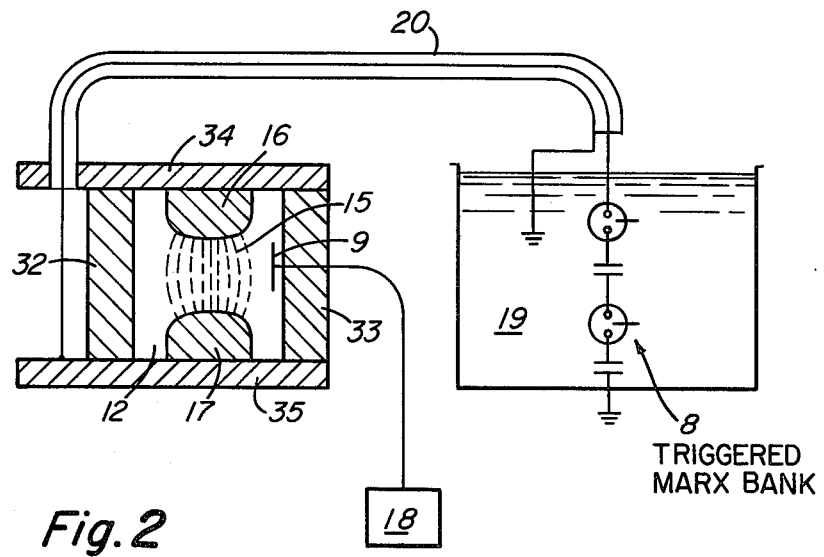
FIG. 2 is a simplified electrical schematic of the laser system of FIG. 1.

Formed as a portion of conduit 10 is an optical gain region 11 which has means for producing coherent laser radiation in the working medium circulating therethrough. Preferably optical gain region 11 comprises an optical resonant cavity 12 formed between mirrors 13 and 14. In the preferred embodiment, a population inversion is produced within optical resonant cavity 12 by means of a controlled electrical discharge 15 obtained using the apparatus shown schematically in FIG. 2. In FIG. 2 optical resonant cavity 12 is shown in cross section across the laser axis. Discharge 15 is produced between parallel spaced electrodes 16 and 17 which extend longitudinally the length of cavity 12. Preionization spark array 9 is placed at a right angle to the plane formed by electrodes 16 and 17 and is spaced equidistant from them. Array 9 extends longitudinally down the length of cavity 12 and is connected to power supply 18. The power supply of electrodes 16 and 17 is a Marx bank 8 immersed in oil bath 19. Marx bank 8 is connected to electrodes 16 and 17 by means of a plurality of high voltage cables 20 (only one of which is shown in FIG. 2).

In the presence of electrical discharge 15, the xenon in the working medium is excited and the following reactions occur:

(1)

(2)

(3)

Figure 3:
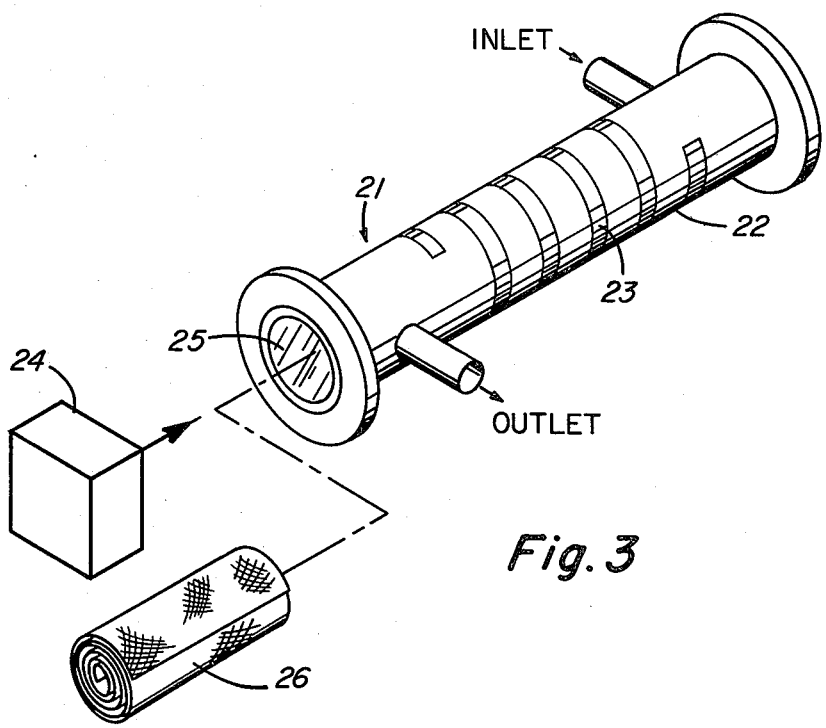
FIG. 3 is a schematic of the recombination means of the laser system of FIG. 1.

While reaction (2) produces the desired lasing output, reaction (3) is highly undesirable in that it results in degradation of the lasing output. Although thermodynamics forces hydrogen and bromine to eventually recombine to produce HBr, in the absence of light, heat, or appropriate catalysts this reaction is rather slow. The reaction mechanism involves chain reactions initiated by either Br atoms or H atoms, both of which are extremely rare at ambient temperatures. Accordingly, the laser system of the invention has means 21 for inducing recombination of $H_2$ and $Br_2$. Various aspects of means 21 are shown schematically in FIG. 3. Recombination means 21 comprises a tube 22 prefereably having heating means 23 disposed along a substantial portion of its length to assure a desired heating of the gaseous working medium flowing therethrough. In one embodiment, light source 24 is disposed at one end of tube 22 for directing radiation through window 25 longitudinally down the length of tube 22. Light source 24 may provide radiation of any appropriate wavelength to photodissociate $Br_2$, thereby providing a source of Br atoms and encouraging reaction with $H_2$ to reform HBr. A pyrex filtered xenon lamp or a 4880 Å argon ion laser may readily be used as light source 24.

In another and preferred embodiment, tube 22 had contained within the heated portion thereof catalytic means 26 for dissociating $H_2$ into H atoms. Platinum has found to serve quite well as catalytic means 26. It is desirable that the catalyst be heated substantially but not so high as to induce significant thermal dissociation of HBr. A temperature of 490° C. has been found to produce good results.

It has been found that any unreacted $Br_2$ which passes through recombination means 21 is detrimental in that it is corrosive to metal parts of conduit 10 and also appears to lower the output energy of the laser. Therefore, in a preferred embodiment means 27 is provided for removing $Br_2$ from the working medium circulating through conduit 10. Means 27 may readily consist of a cold trap with the $Br_2$ partial pressure in the laser system of the invention being fixed by the trap temperature.

In accordance with the invention any suitable means 28 may be used to circulate the working medium at a desired rate through conduit 10. An all metal bellows pump has been found suitable for this purpose. If desired, a surge tank 29 may also be incorporated into conduit 10. Finally, filters 30 and 31 may also be added to conduit 10 to remove particulates from the working medium.

It is important that the loss of lasing energy due to decomposition of the working medium by reaction with the walls of conduit 10 be minimized by the use of suitable construction materials. In obtaining the data of FIG. 4, the materials in contact with the working medium were limited to: Teflon, platinum, Viton, nickel, aluminum.

In the embodiment used to obtain the data of FIG. 4, Marx bank 8 was composed of two 0.06 $\mu$F capacitors charged to 45 kv which discharged through triggered spark gaps. Twenty parallel low inductance cables 20 (Essex Cable Co., 40/100), each 3 meters long, connected the Marx bank to electrodes 16 and 17 through a low impedance path. Walls 32 and 33 of optical resonant cavity 12 were epoxy with a Teflon coating baked on. Base plates 34 and 35 for electrodes 16 and 17 as well as the electrodes were composed of aluminum. Electrodes 16 and 17 had a Chang profile, were 61 cm long, and separated by 2.1 cm.

Preionization was provided by spark array 9 consisting of silver plated flat head screws. The preionization circuit discharged a 0.02 $\mu$F capacitor 18, charged to 15 kV, shortly (approximately 1 $\mu$sec) before the main discharge. The optical system consisted of two wedged silica windows (not shown), a 98% reflectivity flat 13, and a fused silica flat 14 as output coupler.

The circuit 10 shown in FIG. 1 had a system volume of 12.6 liters, a typical operating pressure 3.9 bars at cavity 12, and a usual flow rate of 0.8 liter per second. The discharge volume was 0.3 liter. Cavity 12 had a volume of 4 liters, so that the exchange time for the working medium in cavity 12 at a 0.5 Hz pulse rate corresponded to 3 shots. Recombination means 21 consisted of coiled 52 mesh Pt screens 26 composed of 0.1 mm wire inserted into Pyrex tube 22 which in turn was wrapped with heating tape 23 and then aluminum foil. The platinum catalyst was kept at 490° C. Any bromine molecules passing through recombination means 21 were removed from the gas stream by cold trap 27 which consisted of a dry ice bath.

The measurements recorded in FIG. 4 were arbitrarily standardized in terms of the number of laser pulses above three quarters of the maximum output. Since this number is obviously dependent upon the volume of gas in the system, the data were recorded as number of pulses per liter of gas in the system.

In the absence of the heated platinum catalyst and the cold trap, and with no other recombination means present, typically 12 pulses per liter could be obtained. Using $1.8 \times 10^3$ cm$^2$ total surface are of Pt (100 g), 72 pulses per liter were obtained. Increasing the Pt surface area to $5.5 \times 10^3$ cm$^2$ (300 g) resulted in 130 pulses per liter. These latter data are recorded in FIG. 4.

The most notable feature of FIG. 4 is the marked asymmetry of the graph. This is due, at least in part, to the use of an approximately 20% excess of HBr at the beginning. The solid triangle denotes an addition of HBr to the working medium. The added HBr did not quite return the energy to its maximum value. This appears to be caused by an accumulation of $H_2$ in the system. Means for removing the accumulated $H_2$ would largely negate this problem.

The foregoing description of a preferred embodiment of the invention has been presented for purposes of illustration and description. It is not intended to be exhaustive or to limit the invention to the precise form disclosed. Obviously, many modifications and variations are possible in light of the above teaching. The embodiment stated to be preferred represents the best mode presently contemplated by the inventors for the practice of the invention. It was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. A XeBr laser system which comprises:
   (a) a closed loop conduit through which a gaseous working medium may be repeatedly circulated;
   (b) a gaseous working medium comprising initially xenon, HBr, and a desired rare gas diluent in a desired ratio contained in said closed loop conduit;
   (c) means for producing coherent laser radiation in an optical gain region of said conduit;
   (d) means in said conduit positioned downstream of said optical gain region for including recombination of $H_2$ and $Br_2$ into HBr; and
   (e) recirculation means for continuously pumping said working medium around the fluid circuit described by said conduit.

2. The laser system of claim 1 wherein said means for producing coherent laser radiation in an optical gain region of said conduit comprises means defining an optical resonant cavity and means for producing a controlled electrical discharge in said working medium within said optical resonant cavity.

3. The laser system of claim 1 wherein said means for inducing recombination of $H_2$ and $Br_2$ into HBr includes means for heating said working medium.

4. The laser system of claim 3 wherein said means for inducing recombination of $H_2$ and $Br_2$ into HBr comprises means for photodissociating said $Br_2$ molecules and means for heating said working medium in or immediately upstream of the region wherein said photodissociation is made to occur.

5. The laser system of claim 4 wherein said means for photodissociating said $Br_2$ comprises a xenon lamp or an argon ion laser.

6. The laser system of claim 3 wherein said means for inducing recombination of $H_2$ and $Br_2$ comprises catalytic means for dissociating $H_2$.

7. The laser system of claim 6 wherein said catalytic means for dissociating $H_2$ comprises heated platinum disposed within said conduit.

8. The laser system of claim 1, 2, 3, 4, 6, or 7 having means for removing unreacted bromine from said working medium, said means being disposed in said conduit between said means for inducing recombination of $H_2$ and $Br_2$ and said optical gain region.

9. The laser system of claim 8 wherein said means for removing unreacted bromine from said working medium is a cold trap.

10. The laser system of claim 8 wherein said working medium comprises about 0.15 vol. % HBr and about 5 vol. % xenon, with the remainder being either argon, neon, or a 45 vol. % neon/50 vol. % helium mixture.

11. The laser system of claim 8 having filter means disposed in said conduit for removing particulates from said working medium.

* * * * *